(12) United States Patent
Ritchie et al.

(10) Patent No.: US 11,821,635 B2
(45) Date of Patent: *Nov. 21, 2023

(54) TABLE HAVING A HEATING APPLIANCE

(71) Applicant: The Cashmere Caveman Co, Wild Kitchens Limited, London (GB)

(72) Inventors: Guy Stuart Ritchie, London (GB); Nigel Bruce True, London (GB)

(73) Assignee: The Cashmere Caveman Co, Wild Kitchens Limited, London (GB)

( * ) Notice: Subject to any disclaimer, the term of this patent is extended or adjusted under 35 U.S.C. 154(b) by 118 days.

This patent is subject to a terminal disclaimer.

(21) Appl. No.: 17/200,103

(22) Filed: Mar. 12, 2021

(65) Prior Publication Data

US 2022/0090798 A1 Mar. 24, 2022

Related U.S. Application Data

(63) Continuation of application No. 17/025,681, filed on Sep. 18, 2020, now Pat. No. 11,015,818.

(51) Int. Cl.
| | | |
|---|---|---|
| *F24C 15/30* | (2006.01) | |
| *A47B 37/04* | (2006.01) | |
| *A47J 37/07* | (2006.01) | |
| *F24B 1/02* | (2006.01) | |
| *F24B 5/02* | (2006.01) | |

(52) U.S. Cl.
CPC .............. *F24C 15/30* (2013.01); *A47B 37/04* (2013.01); *A47J 37/0704* (2013.01); *A47J 37/0781* (2013.01); *F24B 1/028* (2013.01); *F24B 5/026* (2013.01); *A47B 2200/0084* (2013.01)

(58) Field of Classification Search
CPC . F24C 15/30; A47B 37/04; A47B 2200/0084; A47J 37/0704; A47J 37/0781; F24B 1/028; F24B 5/026
See application file for complete search history.

(56) References Cited

U.S. PATENT DOCUMENTS

| | | |
|---|---|---|
| 3,217,634 A | 11/1965 | Fox |
| 3,491,744 A | 1/1970 | Kohrn, Jr. |
| 3,745,303 A | 7/1973 | Epperson et al. |
| 3,972,276 A | 8/1976 | Kamra |
| 4,635,612 A | 1/1987 | Kakubari et al. |
| 4,664,026 A | 5/1987 | Milloy |
| 4,759,276 A | 7/1988 | Segroves |

(Continued)

FOREIGN PATENT DOCUMENTS

| | | |
|---|---|---|
| CN | 105091034 A | 11/2015 |
| CN | 205053277 U | 3/2016 |

(Continued)

OTHER PUBLICATIONS

Examination and Search Report issued in Application No. GB2014940.7, dated Mar. 3, 2021, 7 pages.

(Continued)

*Primary Examiner* — Alfred Basichas
(74) *Attorney, Agent, or Firm* — MORRISON & FOERSTER LLP (57) ABSTRACT

A table (1) comprises a table top (4), a heating appliance (3), and a heating appliance holder (2) holding the heating appliance (3). The heating appliance holder (2) comprises a holder main body (7) and a table top holder (8) for holding the table top (4), the table top holder (8) being spaced apart from the holder main body (7) by at least one gap (20).

12 Claims, 6 Drawing Sheets

(56) References Cited

U.S. PATENT DOCUMENTS

| | | | |
|---|---|---|---|
| 4,840,128 A | 6/1989 | McFarlane et al. | |
| 5,094,221 A | 3/1992 | Ho | |
| 5,168,796 A | 12/1992 | Porton et al. | |
| 5,183,027 A | 2/1993 | Saldana | |
| 5,421,321 A | 6/1995 | Ward | |
| 5,599,094 A | 2/1997 | Fischer et al. | |
| 5,778,800 A | 7/1998 | Liang | |
| 6,029,646 A | 2/2000 | Jackson | |
| 6,065,466 A | 5/2000 | Baykal | |
| 6,070,571 A | 6/2000 | Bradbury | |
| 6,640,803 B2 | 11/2003 | Davis et al. | |
| 7,681,493 B2 | 3/2010 | Moore | |
| 8,020,546 B1 | 9/2011 | Bourgeois et al. | |
| 9,474,414 B2 | 10/2016 | Yuen | |
| 10,094,574 B2 | 10/2018 | Quigley | |
| 10,206,537 B1 | 2/2019 | Ebbes | |
| 10,575,680 B2 | 3/2020 | Fagg et al. | |
| 11,015,818 B1 | 5/2021 | Ritchie et al. | |
| 2002/0185122 A1 | 12/2002 | Bossler | |
| 2004/0154603 A1 | 8/2004 | Crawford et al. | |
| 2006/0096545 A1 | 5/2006 | Cone et al. | |
| 2007/0240583 A1 | 10/2007 | Lee | |
| 2008/0178745 A1 | 7/2008 | Hong | |
| 2013/0255659 A1 | 10/2013 | Fulp et al. | |
| 2014/0174427 A1 | 6/2014 | Yuen | |
| 2015/0013664 A1 | 1/2015 | Riel | |
| 2015/0308692 A1 | 10/2015 | Hurt | |
| 2020/0178729 A1 | 6/2020 | Ritchie et al. | |
| 2021/0177202 A1 | 6/2021 | True et al. | |
| 2021/0177204 A1 | 6/2021 | True et al. | |

FOREIGN PATENT DOCUMENTS

| | | | |
|---|---|---|---|
| CN | 205410943 U | 8/2016 | |
| DE | 202013006604 U1 | 8/2013 | |
| DE | 202014004428 U1 | 6/2014 | |
| DE | 202014008980 U1 | 6/2015 | |
| DE | 202020103668 U1 | 8/2020 | |
| EP | 2666385 A1 | 11/2013 | |
| FR | 1570591 A | 6/1969 | |
| FR | 2288504 A1 | 5/1976 | |
| FR | 2903291 A1 | 1/2008 | |
| FR | 2953389 A1 | 6/2011 | |
| GB | 2566042 A | 3/2019 | |
| JP | S57203833 A | 12/1982 | |
| KR | 19990026343 | 7/1999 | |
| KR | 200412388 Y1 | 3/2006 | |
| KR | 200433042 Y1 | 12/2006 | |
| KR | 20090088033 A | 8/2009 | |
| KR | 100950184 B1 | 3/2010 | |
| KR | 20110000388 A | 1/2011 | |
| KR | 20110089386 A | 8/2011 | |
| KR | 20110120546 A | 11/2011 | |
| RU | 166809 U1 | 12/2016 | |
| WO | 96/01395 A1 | 1/1996 | |
| WO | 2017/018589 A1 | 2/2017 | |
| WO | 2019043351 A1 | 3/2019 | |

OTHER PUBLICATIONS

Australian "Examination Report" dated Oct. 31, 2019 issued for Australian Patent Application No. 2018325428.
Canadian Office Action dated Nov. 19, 2019 issued for Canadian Application No. 3,060,168.
Federal Service on Intellectual Property Search Report issued in Russian Application No. 2020108401, and the English translation, 4 pages.
Final Rejection issued in U.S. Appl. No. 16/604,725, dated Sep. 6, 2020, 11 pages.
International Search Report for International Application No. PCT/GB2018/000117.
Issued corresponding priority patent GB 2566042 B which issued on Sep. 4, 2019.
Non-Final Office Action issued in U.S. Appl. No. 16/604,725, dated Nov. 25, 2020, 10 pages.
Response dated Sep. 5, 2018, for corresponding priority application GB 1713935.3.
Russian Office Action issued in Russian Application No. 2020108401, dated Oct. 7, 2020, and the English translation, 6 pages.
UKIPO's "Combined Search and Examination Report" dated Feb. 9, 2018, for corresponding priority application GB 1713935.3.
UKIPO's "Intention to Grant" dated Jun. 19, 2019, for corresponding priority application GB 1713835.3.
UKIPO's "Notification of Grant" dated Aug. 6, 2019, for corresponding priority application GB 1713935.3.
UKIPO's "Search Report" dated Feb. 8, 2018, for corresponding priority application GB 1713935.3.
Written Opinion for International Application No. PCT/GB2018/000117.
Notice of Allowance issued in U.S. Appl. No. 17/319,621, dated Nov. 12, 2021, 6 pages.
Australian Examination Report issued in Australian Application No. 2020286189, dated Dec. 23, 2021, 5 pages.
Non-Final Office Action issued in U.S. Appl. No. 17/319,621, dated Jul. 19, 2021 (22 pages).
Non-Final Office Action issued in U.S. Appl. No. 16/711,147, dated Jul. 21, 2021 (46 pages).
Non-Final Office Action issued in U.S. Appl. No. 17/319,647, dated Jul. 21, 2021 (21 pages).
Non-Final Office Action issued in U.S. Appl. No. 17/319,658, dated Jul. 21, 2021 (20 pages).
Search and Examination Report issued in United Kingdom Application No. GB2014940.7, dated Mar. 3, 2021, 7 pages.
UKIPO Search Report issued in Application No. GB2014940.7, dated Oct. 6, 2021, 2 pages.
Notice of Allowance issued in U.S. Appl. No. 17/318,380, dated Aug. 6, 2021, 28 pages.
Notice of Allowance issued in U.S. Appl. No. 17/319,647, dated Aug. 13, 2021, 9 pages.
Notice of Allowance issued in U.S. Appl. No. 17/319,658, dated Aug. 13, 2021, 9 pages.
Notice of Allowance issued in U.S. Appl. No. 16/711,147, dated Aug. 18, 2021, 9 pages.
International Search Report and Written Opinion issued in International Application No. PCT/IB2020/001031, dated Apr. 14, 2021, 12 pages.
Notice of Allowance issued in U.S. Appl. No. 16/604,725, dated Apr. 29, 2021, 19 pages.
Extended European search report issued in EP21196132.1, dated Jun. 8, 2022 (11 pages).

TABLE HAVING A HEATING APPLIANCE

TECHNICAL FIELD

The present invention relates to a table that can be used outdoors and that has a heating appliance.

BACKGROUND INFORMATION

GB 2566042 discloses such a table wherein the table has a heating appliance holder in the form of a container which holds a heating appliance and the heating appliance holder extends below an underside of the table top. Legs of the table are attached to the underside of the table top. Heat from the heating appliance may be conducted to the table top via the heating appliance holder which may damage the table top. The heating appliance is controlled by an actuator underneath the table top which may be difficult to operate when a person is seated by the table. Also, people in wheelchairs may find it difficult to sit around the table.

SUMMARY OF THE INVENTION

It is an object of the present invention to provide a table having a heating appliance which can alleviate at least one of the above-mentioned problems.

According to a first aspect of the present invention there is provided a table comprising a table top, a heating appliance, and a heating appliance holder holding the heating appliance, the heating appliance holder comprising a holder main body and a table top holder for holding the table top, the table top holder being spaced apart from the holder main body by at least one gap.

By the heating appliance holder having the at least one gap, this reduces heat being conducted to the table top from the heating appliance via the heating appliance holder which can prevent the table top from being charred. The least one gap also reduces heat being conducted to the table top holder. Air can flow through the at least one gap.

The at least one gap may be beneath the table top holder. The table top holder may extend at least partially around a perimeter of the heating appliance holder. There may be a series of said gaps spaced at least partially around the perimeter of the heating appliance holder.

The table top may cantilever from the heating appliance holder. This enables people in wheelchairs to be able to position themselves around the table. The table top may comprise at least two table top portions. The table top portions may be removable from the table top holder to save storage space such as when the table is being transported. The table top holder may comprise at least one groove for holding the table top portions. The table top portions may cantilever from the at least one groove. The groove may comprise an annular groove configured to extend around the heating appliance held by the heating appliance holder.

The heating appliance holder may include at least one leg.

The heating appliance may comprise a fire box with a fire box chamber and a chamber opening at a top of the fire box for placing inside the fire box combustible fuel, such as wood or charcoal, with which the heating appliance is used, and a fire door for closing the opening. The fire door may have a window. The window may allow an attractive view of flames from combusting fuel to be seen. The table can be used to produce a warm micro climate and visually pleasing ambience. The fire door may be substantially coplanar with an upper surface of the table top when the fire door is in a closed position.

The fire box may have at least one side wall. The at least one side wall may surround the fire box chamber.

The fire box chamber may have a combustible fuel holder which may comprise a grate.

The heating appliance may include a first air inlet for supplying an air flow to the fire box chamber for combusting the combustible fuel.

The first air inlet may be on or through an underside of the fire box. The heating appliance may have a control valve for controlling the supply of air through the first air inlet. The control valve may be adjacent or mounted on the underside of the fire box. The table may include an actuator for actuating the control valve, wherein the actuator extends above the table top.

The first air inlet may be on or through a said side wall of the fire box. The table may include a second air inlet for supplying an air flow to the fire box chamber for combusting said combustible fuel, wherein the second air inlet is on or through the side wall of the fire box. The first air inlet may be above the combustible fuel holder and the second air inlet may be below the combustible fuel holder. The heating appliance may include a first control valve adjacent or mounted on said side wall of the fire box for controlling the supply of air through the first and second air flow inlets. The table may include a first actuator for actuating the first control valve. The first actuator may extend above the table top. The first actuator may be fixed to or form an integral unit with the first control valve.

The table may include a third air inlet for supplying an air flow to the fire box chamber for combusting the combustible fuel wherein the third air inlet is on or through an underside of the fire box. The heating appliance may have a second control valve for controlling the supply of air through the third air inlet. The second control valve may be adjacent or mounted on the underside of the fire box. The table may include a second actuator for actuating the second control valve. The second actuator may extend above the table top. The second actuator may be adjacent or mounted on the side wall of the fire box.

By at least one of the first and second actuators extending above the table, a person seated by the table can easily control the heating appliance.

The heating appliance may include a flue exhaust for emissions to exit from the fire box chamber.

The heating appliance may have a lower chamber beneath the fire box chamber. The lower chamber may be connected by at least one air conduit to the fire box chamber. The third air inlet may enter the lower chamber.

The holder main body may comprise at least one side wall which surrounds the heating appliance and a base. The heating appliance may be received on said base. There may be a second gap between the heating appliance and the at least one side wall of the heating appliance holder. The second gap may form an air gap or a heat insulation gap. The at least one side wall may have at least one aperture.

The at least one air inlet may be configured to receive air via the at least one wall aperture.

The heating appliance may be centrally positioned in the table top.

According to a second aspect of the present invention there is provided a table comprising a table top, a heating appliance, a heating appliance holder holding the heating appliance, the heating appliance holder comprising a holder main body and a table top holder for holding the table top, and the heating appliance comprising: a fire box with a fire box chamber and a chamber opening at a top of the fire box for placing inside the fire box combustible fuel with which the heating appliance is used, a fire door for closing the opening, an air inlet for supplying an air flow to the fire box chamber for combusting the combustible fuel, a control valve for controlling the supply of air through the air inlet, and an actuator for actuating the control valve wherein the actuator extends above the table top.

The second aspect of the present invention may include any appropriate combination of features of the first aspect of the present invention.

BRIEF DESCRIPTION OF THE DRAWINGS

An embodiment of the present invention will now be described, by way of example, with reference to the accompanying schematic drawings, in which.

DESCRIPTION

Referring to FIGS. 1 to 6 of the accompanying drawings, a table 1 comprises a heating appliance holder or safety cage 2, a heating appliance or stove or burner 3 held by the holder 2, and a rectangular table top 4 which comprises a pair of table top portions 5, 6.

Figure 1:
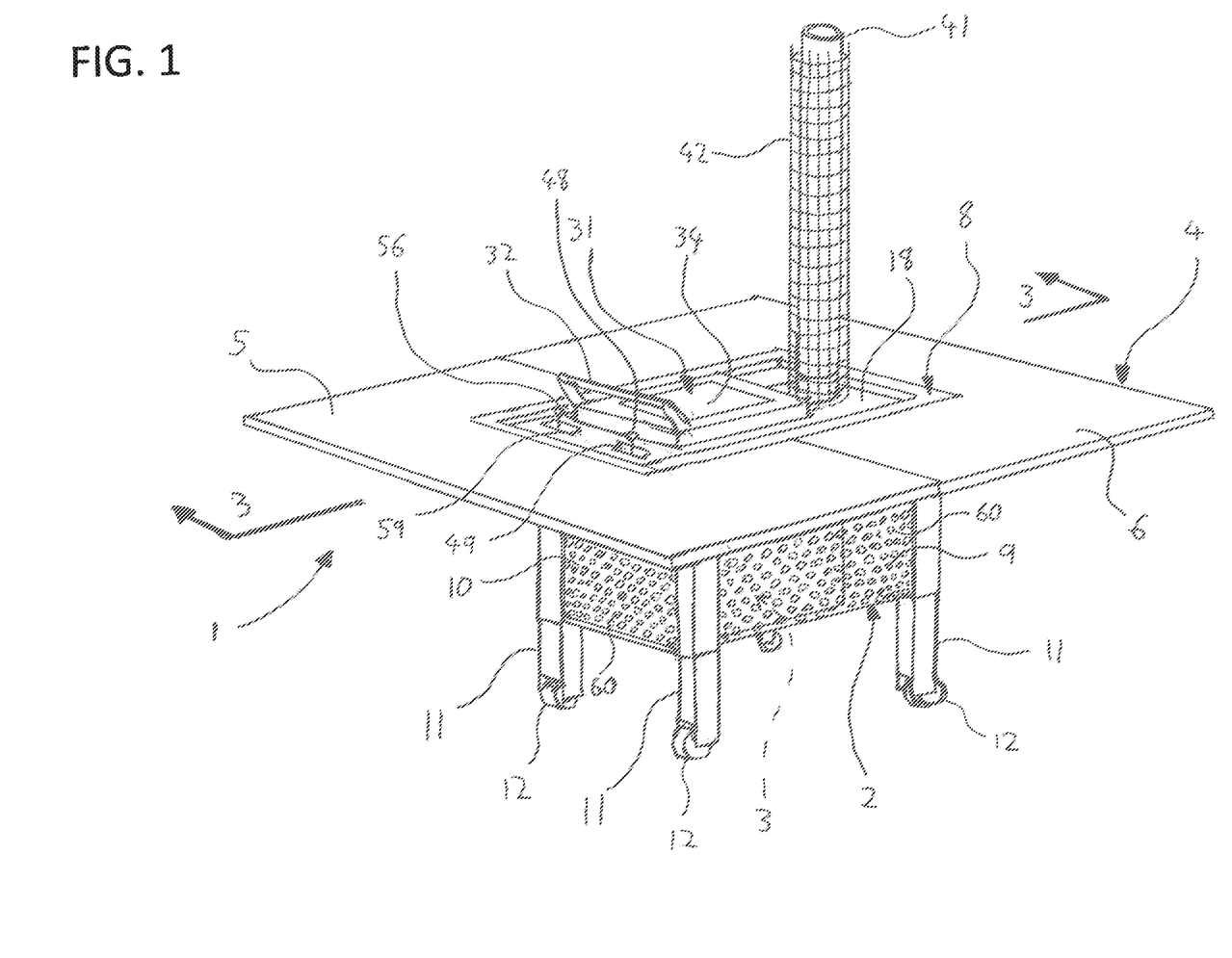
FIG. 1 is a perspective view of a table according to one embodiment of the invention.
Figure 2:
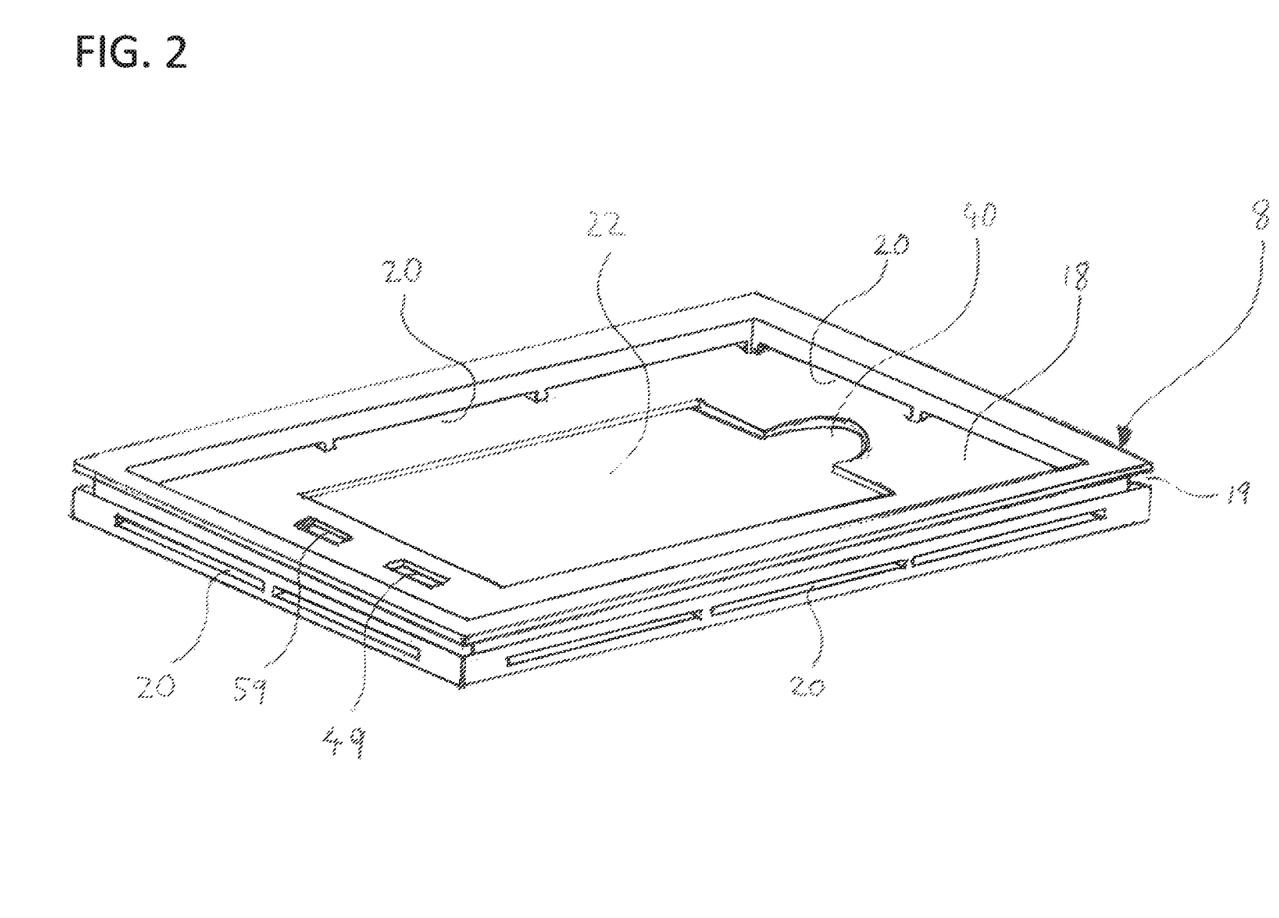
FIG. 2 is a perspective view of an upper part of a holder of a heating appliance of the table.
Figure 3:
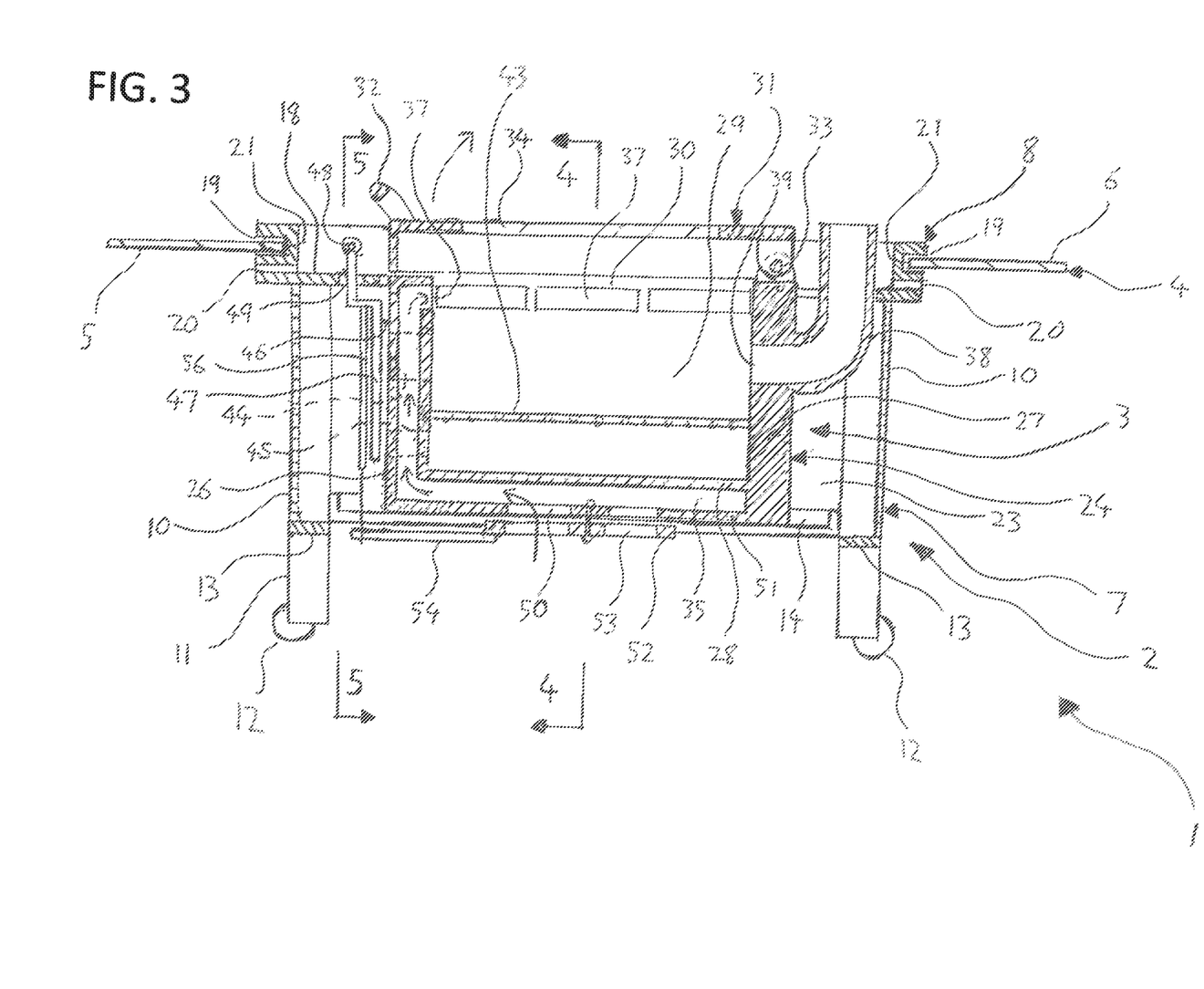
FIG. 3 is a longitudinal sectional view taken along lines 3-3 of FIG. 1 wherein an upper part of a flue of the heating appliance of the table is omitted.

The heating appliance holder 2 comprises a holder main body 7 and a table top holder 8 for holding the table top 4.

The holder main body 7 is cuboid in shape and comprises two longitudinal side walls 9, two end walls 10 and a leg 11 at each corner wherein each leg 11 extends below the walls 9, 10 and terminates with a wheel 12. A strut 13 connects the legs 11 on either side of each end wall 10 and the strut 13 is just below the end wall 10. An L-shaped rail 14 extends between the legs 11 on each side of the longitudinal side wall 9 and has an upright 15 and a flange 16. The back of the upright 15 of the rail 14 is fixed to an inside surface of each of the legs 11. The bottom of each longitudinal side wall 9 has a return 17 which ends at the back of the rail upright 15. The longitudinal side walls 9 and the end walls 10 have many apertures 60.

The tops of the legs 11 and the longitudinal side walls 9 and end walls 10 are connected to the underside of a rectangular sheet 18 which extends outwardly beyond the walls 9, 10 and legs 11 and which forms part of the holder main body 7. On the opposite side of the sheet 18, the table top holder 8 in the form of a C-shaped member extends around the perimeter of the sheet 18 wherein the C-shaped member forms an annular groove 19 which faces outwardly. The table top holder 8 is spaced apart from the sheet 18 beneath by a series of gaps 20 spaced along the perimeter.

Each table top portion 5, 6 has a recess which enables an inside edge 21 of the table top portion 5, 6 to be slotted into groove 19 so that the table top portion 5, 6 is held by the groove 19 and cantilevers from the groove 19. When the inside edge 21 of both table top portions 5, 6 are fully inserted into the groove 19 the table top portions 5, 6 form the rectangular table top 4.

The sheet 18 has a substantially rectangular opening 22 to enable the main body 7 of the heating appliance holder 2 to receive the heating appliance 3. The heating appliance 3 sits on the flanges 16 of the two rails 14 between the uprights 15, and a base of the holder main body 7 comprises the rails 14. The heating appliance 3 is surrounded by the walls 9, 10 of the heating appliance holder 2 and there is a gap 23 between the walls 9, 10 of the heating appliance holder 2 and the heating appliance 3.

The heating appliance 3 comprises a fire box 24 having two longitudinal side walls 25, first and second end walls 26, 27 and a floor 28 which define a chamber 29 of the fire box 24 wherein the walls 25, 26, 27 define an opening 30 to the chamber 29 at the top. A fire door 31 is hinged to the top of the second end wall 27 and used to close the chamber opening 30. The fire door 31 has a handle 32 distal to the hinged connection 33 to the second end wall 27. The fire door 31 has a window 34, and is substantially coplanar with an upper surface of the table top 4 when the fire door 31 is in a closed position.

Figure 4:
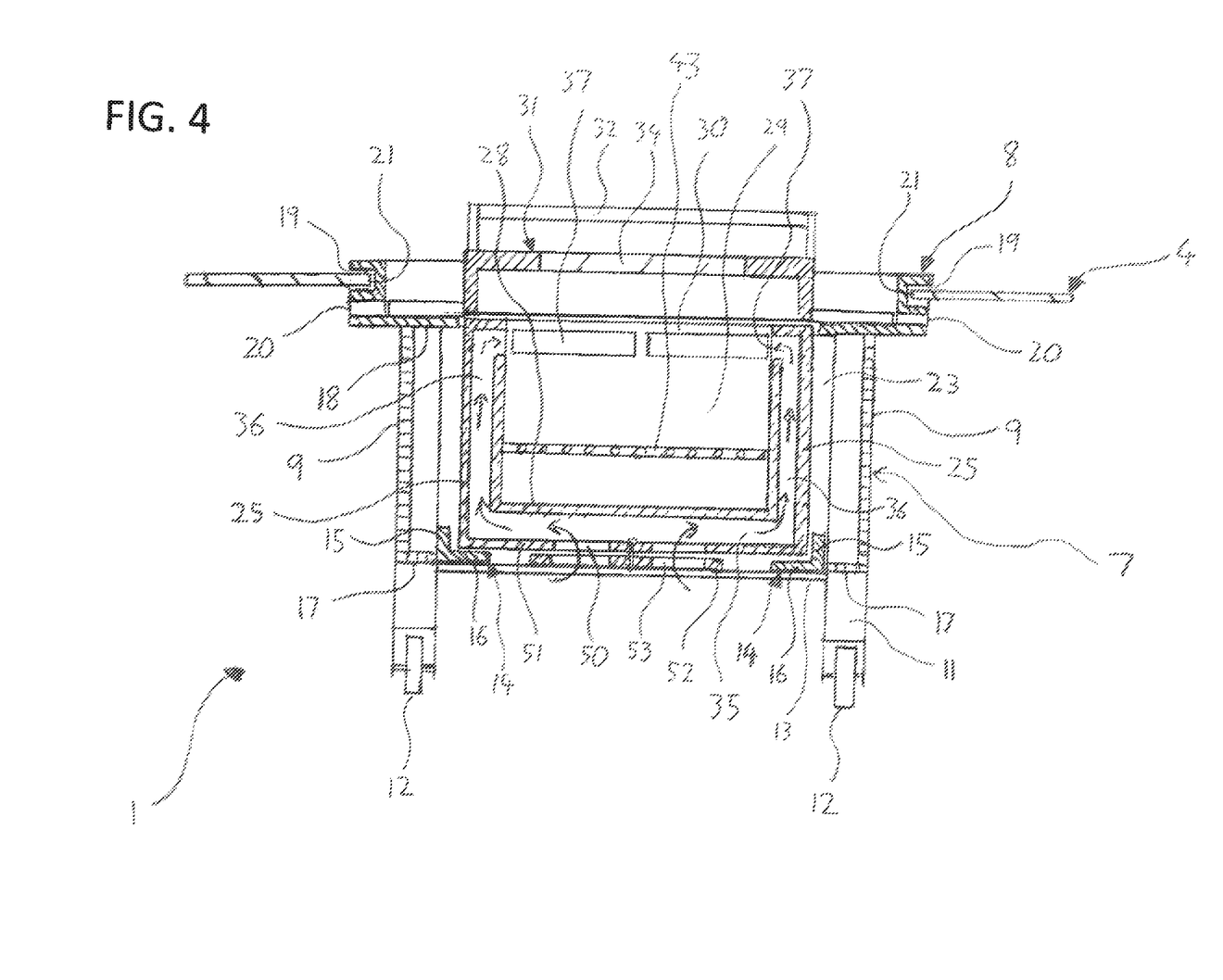
FIGS. 4 and 5 are cross-sectional views taken along lines 4-4 and 5-5, respectively, of FIG. 3.
Figure 5:
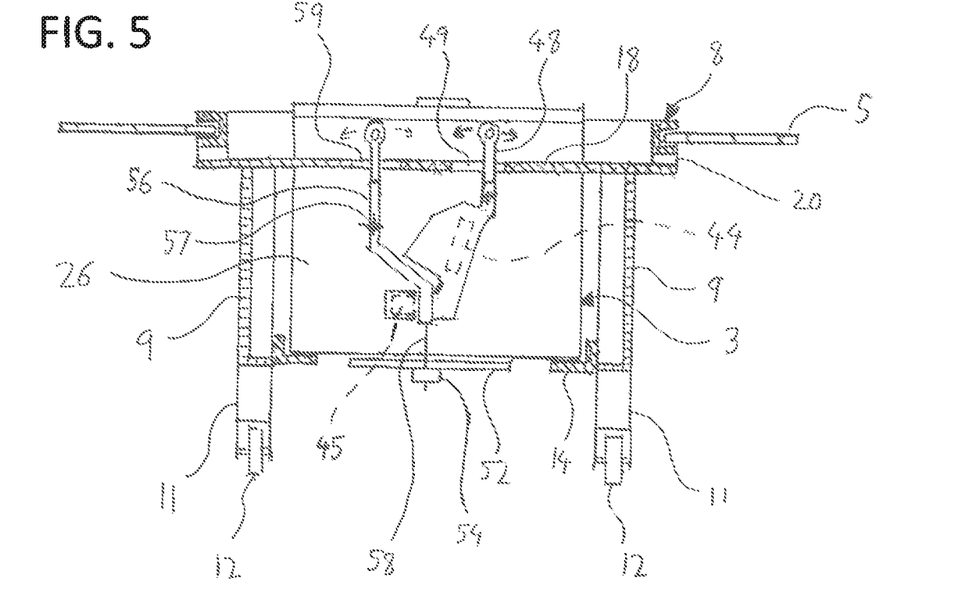

The two longitudinal side walls 25, and the first end wall 26 are cavity walls. The heating appliance 3 has a lower chamber 35 beneath the floor 28 of the fire box chamber 29 and the lower chamber 35 extends to the cavities 36 of the longitudinal side walls 25 and the first end wall 26. The cavities 36 are connected to openings or outlets 37 into the fire box chamber 29 in an upper portion of the longitudinal side walls 25 and the first end wall 26.

A flue base 38 extends from an opening 39 in the second end wall 27 and the flue base 38 initially bends through 90 degrees before it extends upwards through an extension 40 to the sheet opening 22. A flue extension 41 extends upwards from the flue base 38 and the flue extension 41 and a portion of the flue base 38 which extends above the sheet 22 is surrounded by a cylindrical mesh 42. The flue base 38 and flue extension 41 form an exhaust for emissions to exit from the fire box chamber 29 and directs emissions or smoke away from people sitting around the table 1.

A rack (not shown) may be attached to the flue extension 41 or the surrounding mesh 42. The rack may have hooks from which, say, bowls and utensils can be hung.

The fire box chamber 29 has a grate 43 which is spaced above the floor 28 of the fire box chamber 29. A first air inlet conduit 44 extends from the outside of the fire box 24, through the first end wall 26 and into the fire box chamber 29 above the grate 43, and a second air inlet conduit 45 extends from the outside of the fire box 24, through the first end wall 26 and into the fire box chamber 29 below the grate 43. Both the first and second air inlet conduits 44, 45 are rectangular in shape. The longitudinal sides of the first air inlet conduit 44 are inclined at an acute angle to the vertical towards a first pivot connection 46 on the first end wall 26. The longitudinal sides of the second air inlet conduit 45 are parallel to the bottom of the fire box 24 and the second air inlet conduit 45 is positioned below the first air inlet conduit 44 and is further away from the first pivot connection 46 than the first air inlet conduit 44.

A first control valve 47 is mounted on the first pivot connection 46 on the outside of the first end wall 26 and is shaped so that it can cover an entrance to just the first air inlet conduit 44 or both the first and second air inlet conduits 44, 45 or neither air inlet conduit depending on which position the first control valve 47 is rotated to about the first pivot connection 46. The first control valve 47 is connected to a first actuator or lever 48 which extends upwards through a first slot 49 in the sheet 18 of the heating appliance holder 2. The first control valve 47 and first actuator 48 form an integral unit.

The underside of the heating appliance 3 has a plurality of radial openings or inlets 50 extending into the lower chamber 34 through a floor 51 of the lower chamber 34. A second control valve 52 (see FIG. 6) in the form of a disc is rotatably mounted on the underside of the heating appliance 3 and has a plurality of radial openings 53 which corresponds to the radial openings 50 in the underside of the heating appliance 3. The disc 52 is between the rails 14 of the heating appliance holder 2. A rod 54 extends from the disc 52 and extends beyond the bottom of the first end wall 26 of the fire box 24. A distal end of the rod 54 has an aperture 55.

Figure 6:
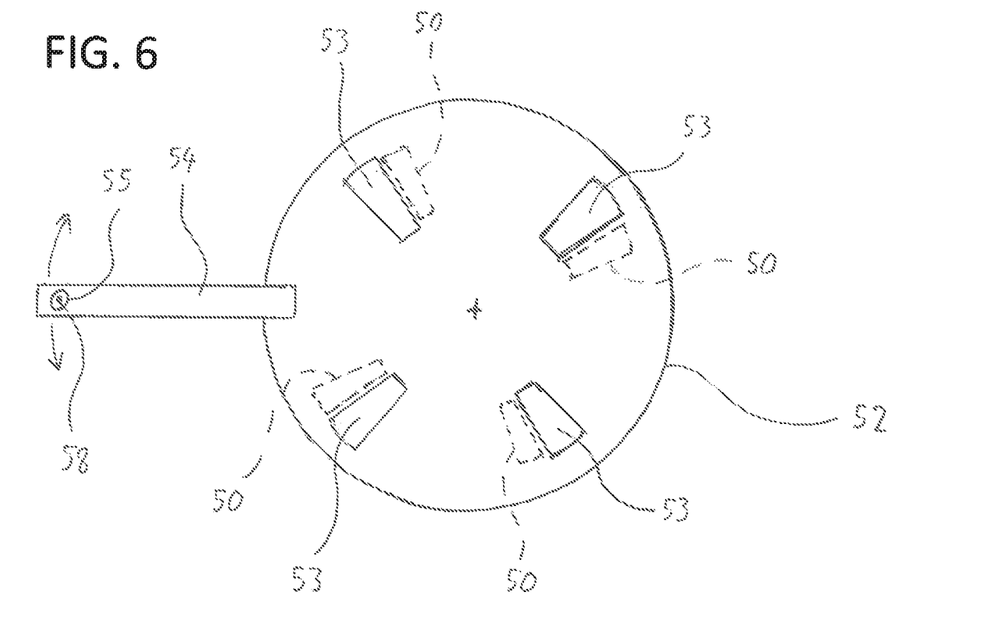
FIG. 6 is a view of an underside of a part of the heating appliance.

A second actuator or lever 56 is mounted on a second pivot connection 57 on the outside of the first end wall 26 and a pin 58 forms a bottom of the second actuator 56 which is received in the aperture 55 in the distal end of the rod 54. The second actuator 56 extends upwards through a second slot 59 in the sheet 18 of the heating appliance holder 2.

Figure 7:
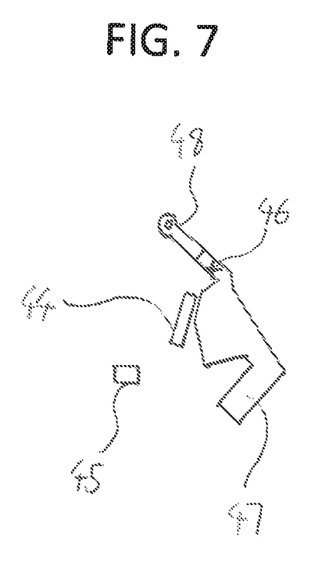
FIGS. 7 to 9 are views of a control valve and actuator of the heating appliance in various positions.
Figure 8:
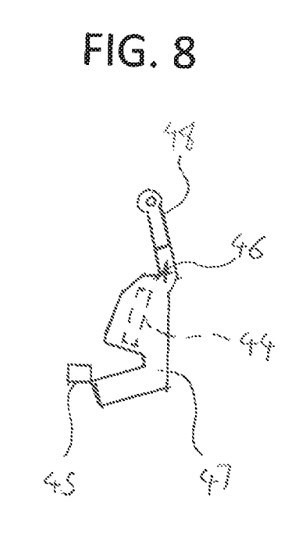
Figure 9:
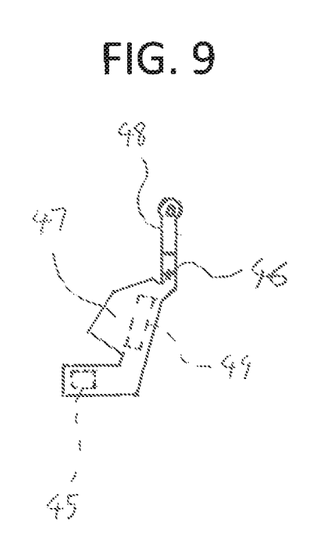

In use, the fire door 31 of the heating appliance 3 is opened and combustible solid fuel is placed on the grate 43 inside the fire box chamber 29.

Where the combustible fuel is charcoal, the first actuator 48 may be used to ensure that the first control valve 47 does not cover the entrances to the first and second air inlet conduits 44, 45 (see FIG. 7) and the second actuator 56 may be used to ensure that the second control valve 52 has been rotated into a position so that it covers the heating appliance radial openings 50. Air is received in the fire box chamber 29 from outside the table 1 via the apertures 60 in the end wall 10 of the heating appliance holder 2 in front of the first end wall 26 of the heating appliance 3 and via the first and second air inlet conduits 44, 45. The combustible solid fuel is ignited, and the first actuator 48 is used to rotate the first control valve 47 about the first pivot connection 46 so that the first control valve 47 just covers the entrance to the first air inlet conduit 44 (see FIG. 8). The first actuator 48 can then be used to rotate the first control valve 47 so that it partially covers the entrance to the second air inlet conduit 45 as well as fully covering the entrance to the first air inlet conduit 44 in order to control the burning of the charcoal and the amount of heat produced.

Where the combustible fuel is wood, the first actuator 48 is used to rotate the first control valve 47 so that it covers the entrances to both the first and second air inlet conduits 44, 45 (see FIG. 9) and the second actuator 56 is used to rotate the second control valve 52 so that it can at least partially cover the heating appliance radial openings 50 in order to control the burning of the wood and the amount of heat produced.

In a specific example of a preferred embodiment, the gaps 20 between the table top holder 8 and the sheet 18 below may be 2 mm in height. The table top portions 5, 6 may comprise wood.

Whilst a particular embodiment has been described, it will be understood that various modifications may be made without departing from the scope of the claimed invention.

The heating appliance, the heating appliance holder and the table top may have different shapes from that shown. For example, the heating appliance may be a substantially cube shape, and the table top may be substantially square.

At least one of the legs may not have a wheel. For example, each of the legs may not have a wheel.

The invention claimed is:

1. A table comprising a table top, a heating appliance comprising a fire box with a fire box chamber and a chamber opening at a top of said fire box for placing inside said fire box combustible fuel with which said heating appliance is used, said fire box chamber having a combustible fuel holder, and said heating appliance having a first air inlet for supplying an air flow to said fire box chamber for combusting said combustible fuel, said first air inlet being through a side wall of said fire box, and a heating appliance holder holding said heating appliance, said heating appliance holder comprising a holder main body and a table top holder for holding said table top,
wherein:
    said heating appliance includes a fire door for closing said opening;
    said heating appliance includes a second air inlet for supplying an air flow to said fire box chamber for combusting said combustible fuel, wherein said second air inlet is through said side wall of said fire box, and said first air inlet is above said combustible fuel holder and said second air inlet is below said combustible fuel holder;
    said heating appliance includes a first control valve adjacent said side wall of said fire box for controlling the supply of air through said first and second air flow inlets, and a first actuator for actuating said first control valve, wherein said first actuator extends above said holder main body; and
    said table top holder being spaced apart from said holder main body by at least one gap.

2. The table of claim 1, wherein the side wall surrounds the heating appliance and a base on which the heating appliance is received.

3. The table of claim 1, wherein said at least one gap is beneath said table top holder.

4. The table of claim 1, wherein said table top holder extends at least partially around a perimeter of said heating appliance holder.

5. The table of claim 4, further comprising a series of gaps spaced at least partially around said perimeter of said heating appliance holder.

6. The table of claim 1, wherein said table top comprises at least two table top portions, and wherein said table top holder comprises at least one groove for holding said table top portions.

7. The table of claim 6, wherein said table top portions cantilever from said at least one groove.

8. The table of claim 6, wherein said at least one groove comprises an annular groove configured to extend around said heating appliance held by said heating appliance holder.

9. The table of claim 1, wherein said first actuator is fixed to said first control valve.

10. The table of claim 1, further comprising a third air inlet for supplying an air flow to said fire box chamber for combusting said combustible fuel wherein said third air inlet is through an underside of said fire box.

11. The table of claim 10, wherein said heating appliance comprises a second control valve for controlling the supply of air through said third air inlet, and a second actuator for actuating said second control valve, wherein said second actuator extends above said holder main body.

12. The table of claim 11, wherein said second actuator is adjacent said side wall of said fire box.

* * * * *